(12) United States Patent
Jeon

(10) Patent No.: US 6,760,460 B1
(45) Date of Patent: Jul. 6, 2004

(54) SPEAKER SYSTEM FOR DISPLAY

(75) Inventor: Chang Wook Jeon, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/465,797

(22) Filed: Dec. 17, 1999

(30) Foreign Application Priority Data

Apr. 16, 1999 (KR) ........................................ 1999/13566

(51) Int. Cl.⁷ ............................................ H04R 25/00
(52) U.S. Cl. ...................... 381/388; 381/333; 381/386; 381/395; 361/681; 361/807; 181/199; 181/198
(58) Field of Search ................................. 381/333, 306, 381/388, 374, 386, 391, 181, 395, 681–683, 345, 353, 346, 348, 349, 354, 392; 361/807, 354; 181/199

(56) References Cited

U.S. PATENT DOCUMENTS

| 5,048,089 A | 9/1991 | Moore .......................... 381/87 |
| 5,629,503 A | 5/1997 | Thomasen .................. 181/199 |
| 5,689,574 A | * 11/1997 | Heirich |
| 5,881,989 A | 3/1999 | O'Brien et al. ............. 248/634 |

FOREIGN PATENT DOCUMENTS

| GB | 2302233 | 1/1997 |
| GB | 2303992 | 3/1997 |
| GB | 2307136 | 5/1997 |
| GB | 2349036 A | 10/2000 |
| JP | 58-133838 | 8/1956 |
| JP | 61-166680 | 10/1986 |
| JP | 62-137621 | 3/1989 |
| JP | 1178951 | 7/1989 |
| JP | 63-114489 | 3/1990 |
| JP | 3292096 | 12/1991 |
| JP | 5049082 | 2/1993 |
| JP | 5207577 | 8/1993 |
| JP | 8-163679 | 6/1996 |
| JP | 8223678 | 8/1996 |
| JP | 9116991 | 5/1997 |
| JP | 9298787 | 10/1997 |
| JP | 10066179 | 3/1998 |
| JP | 10098793 | 4/1998 |
| JP | 10210580 | 8/1998 |
| WO | WO 95/01078 | 1/1995 |

* cited by examiner

Primary Examiner—Curtis Kuntz
Assistant Examiner—Dionne Harvey
(74) Attorney, Agent, or Firm—Fleshner & Kim, LLP

(57) ABSTRACT

Speaker system for a display including a cover frame integrated type speaker 1 having a cover frame 101 with screw holes 106 for assembly with a rear cover 2 at top and bottom thereof and a speaker 100 for emitting sound integrated with the cover frame 101, a rear cover 2 fastened to a rear of the cover frame integrated type speaker 1 having a vibration attenuation member mounting unit 200 provided on top and bottom thereof, and vibration attenuation means disposed between the cover frame integrated type speaker 1 and the cabinet for attenuating a system vibration to prevent transmission of the system vibration to the cabinet 4, whereby saving cost, improving a productivity, preventing a pressure loss of a sound directed forward caused by a leaked sound directed backward, and attenuating a system vibration from the speaker so as not to reach to the cabinet, to provide a speaker of a high sound quality and a low howling.

31 Claims, 13 Drawing Sheets

SPEAKER SYSTEM FOR DISPLAY

BACKGROUND OF THE INVENTION

1. Field of the Invention

The present invention relates to a speaker system for a display, and more particularly, to a speaker system for a display, of which structure is modified for providing a high tone quality and low howling.

2. Background of the Related Art

In general, the display, such as a computer monitor, having a built-in speaker system provides the speaker system in a space between an outside wall of a Braun tube and an inside wall of a cabinet enclosing the Braun tube, a width of which fixes a width of the speaker system. And, the width of the speaker system fixes a short diameter of the speaker in the speaker system, and serves as a parameter for fixing a ratio of a long diameter to the short diameter. The ratio of the long diameter to the short diameter of the speaker gives a great influence to a tone quality of the speaker; if other conditions are the same, the speaker system is the most favorable for implementing a high tone quality when the ratio is 1:1. That is, the closer a geometry of a gasket and cone paper of the speaker to a true circle, the favorable for implementing a high tone quality.

A related art speaker system for a display will be explained with reference to FIGS. 1~5. FIG. 1 illustrates a disassembled perspective view of a related art speaker system for a display, FIG. 2 illustrates a section across line I—I in FIG. 1, and FIG. 3 illustrates a section of an assembled speaker system in FIG. 1. FIG. 4 illustrates a section across line II—II, and FIG. 5 illustrates a front view of a related art display, schematically.

Referring to FIGS. 1~2, a related art track type speaker system for a display is provided with a track type speaker 100a (called as "speaker" hereafter), a front cover 6 mounted on a front face of the speaker 100a, and a rear cover 2 mounted on a rear of the speaker 100a. The speaker 100a is provided with a frame 600, a gasket 102, an edge 103 fitted to an inside surface of the gasket 102 for forming a ring, and a cone paper 104 fitted to an inside surface of the edge 103 to form a cone. The frame 600 has a screw hole 601 at each corner. The front cover 6 of a rectangular form in overall has an ecliptic opening 602 on a central portion for passing a sonic wave, a gasket fitting surface 603 and a rear cover fitting surface 604, both at the rear face. There are bosses 605(called as "speaker fastening boss" hereafter) each having a screw hole for a speaker fastening screw 701 and bosses 606(called as "rear cover fastening boss" hereafter) each having a screw hole for a rear cover fastening screw 702, both on an inside surface of a back of the front cover 6, and a portion 608 for a pass through hole on top and bottom of the front cover 6 for a screw 703 to be coupled to a screw hole 404 in a speaker system fastening boss 403 on the cabinet 4 to pass through. As shown in FIG. 4, the rear cover fitting surface 604 is formed further rear of the gasket fitting surface 603. And, the rear cover 2 has a form of an empty box in overall for enhancing resonance, is provided with screw holes 206 for fastening to the rear cover fastening bosses 606 formed on the front cover 606 and guide grooves 207 for guiding screws to the screw holes 206, on both sides thereof. And, the cabinet 4 having the speaker system including the speaker 100a, the front cover 6 and the rear cover 2 mounted thereon is provided with a plurality of sonic wave discharge holes 402 for discharging the sonic wave during operation of the speaker, and a boss 403 for fastening the speaker system for fastening an assembled speaker system to the cabinet 4 by screw fastening with the front cover 6(see FIG. 3).

The process for assembling the related art speaker system will be explained.

Under a condition that the speaker fastening bosses 605 on the front cover 6 and the screw holes 601 at four corners of the frame 600 of the speaker 100a are matched, the speaker fastening screws 701 are fastened through the screw fastening holes 601 for assembling the front cover 6 and the speaker 100a together. According to this, a gasket contact surface 603 of the front cover 6 and the gasket 102 on the speaker 100a comes into a close contact, to prevent a loss of a sound pressure of a sound directed forward coming from a leakage of a sound directed backward. After the front cover 6 and the speaker 100a are jointed, the rear cover fastening screws 702 are fastened through the screw holes 206 for assembling the front cover 6 and the rear cover 2 together under a condition the rear cover fastening bosses 606 on the front cover 6 and the screw holes 206 in the rear cover 2 are matched. Then, the screws 703 are screwed into the speaker system fastening bosses 403 through pass through holes 609 under a state the speaker system fastening bosses 403 on the cabinet 4 and the pass through holes 609 in the portions 608 for pass through holes in the front cover 6 are matched, for fastening the speaker system on the cabinet 4.

However, the related art speaker system applied to a display has the following problems caused by limitation of a structure.

The related art speaker system for a display requires the complicated shaped front cover 6 with a plurality of bosses 605 and 606 as a medium for fastening the speaker 100a to the rear cover 2 which serves as a resonance box. The front cover 6 is required without fail as medium means for mounting the related art speaker system to the cabinet 4, for providing the portions 608 for pass through holes on the front cover 6. Therefore, the related art speaker system is disadvantageous in that many components which have complicated shape are required, not only to cost much, but also to drop a productivity in fabrication and assembly of the components. The requirements for the complicate shaped front cover 6 in the related art leads to require for many components and fastening members in assembly of the components as many. Due to this, the related art speaker system has many cost push factors, difficulties in fabrication of the components, and is required many assembly man power in an assembly line. Particularly, a gap("A" in FIG. 4) required between an inside surface of the outside wall of the front cover 6 and the outside surface of the speaker 100a affects to a design and material cost. That is, the gap("A" in FIG. 4) between the inside surface of the outside wall of the front cover 6 and the outside surface of the speaker 100a is required in assembly of the front cover 6 with the rear cover 2 without fail, for providing the rear cover fastening bosses 606 for use in assembly of the rear cover 2 on an outside region of the speaker 100a. As the gap "A" should be secured between the inside surface of the outside wall of the front cover 6 and the outside surface of the speaker 100a due the above reason, a width("C" in FIG. 4) of the front cover 6 becomes larger than a width("B" in FIG. 4) of a speaker frame 600. More precisely, the width(the same with the width of the rear cover) of the front cover 6 is larger as much as a two times of a thickness of the front cover being added to a value two times of the gap "A" in FIG. 4 in comparison to a width of the frame 600. In the meantime, the speaker system should have gaps provided to the inside surface of the cabinet 4 and the outside surface of the Braun tube.

According to this, because a gap("D" in FIG. 5) between the inside surface of the cabinet 4 and the outside surface of the Braun tube for placing the speaker system therein also should be the larger as much as a size of the gap("A" in FIG. 4) between the inside surface of the outside wall of the front cover 6 and the outside surface of the speaker 100a, as explained before, this affects to the design and cost of the speaker system.

In the meantime, a symbol "F" in FIG. 5 is a width of a monitor in the related art speaker system. There is another problem in the related art speaker system for a display. Though it is designed that the rear cover fitting surface 604 of the front cover 6 makes a close contact with the front cover fitting surface 208 of the rear cover 2 for preventing a sound pressure of a sound directed forward coming from an influence of a leaked sound directed backward, the imperfect blocking of a leakage of the sound directed backward through a gap between the close contact surfaces causes a loss of the sound pressure of the sound directed forward, because a perfect close contact between the rear cover fitting surface 604 of the front cover 6 and the front cover fitting surface 208 of the rear cover 2 can hardly be achieved. When there is a leakage of the sound directed backward, there is a problem in that a pressure of a sound directed forward is dropped by the sound directed backward that has a phase opposite to the sound directed forward.

The related art speaker system for a display has another problem.

Referring to FIG. 3, the fastening of the front cover 6 at sides of the speaker 100a in the related art speaker system forms a length of sonic wave passage from the gasket to the front surface of the front cover 6, for the sound directed forward emitted from the speaker 100a to pass through when the speaker is in operation. In this instance, the sound passage acts to cause a tunnel effect for the sound directed forward, to deteriorate the sound directed forward from the speaker 100a. The tunnel effect is a phenomenon in which a particular frequency of the sound is offset as the sound passes through the sound passage while another particular frequency of the sound is amplified, to impede implementation of a desired sound quality. Moreover, the direct connection of the related art speaker system to the cabinet 4 without attenuation of vibration by means of the screws, a rigid body, causes direct transmission of a system vibration to the Braun tube when the speaker is in operation when the speaker is in operation, thereby resulting in a serious flickering of image. That is, the vibration transmitted to the Braun tube directly without attenuation causes resonance with a shadow mask fitted on an inside surface of the Braun tube, that causes the flickering of the image. And, moreover, the aforementioned problem has been impeded provision of a high powered speaker, and particularly, a low frequency band could not have been lowered further to result in deterioration of a sound quality because the image flickering is serious at a frequency below 200 Hz, that impedes provision of a high quality speaker system built-in a display.

SUMMARY OF THE INVENTION

Accordingly, the present invention is directed to a speaker system for a display that substantially obviates one or more of the problems due to limitations and disadvantages of the related art.

An object of the present invention is to provide a speaker system for a display, in which a number of components is reduced for saving a production cost and improving a productivity in fabrication and assembly of components, and a ratio of a short axis to a long axis of the speaker is made to be close to 1:1 for improving a sound quality.

Another object of the present invention is to provide a speaker system for a display which can prevent a pressure loss of a sound directed forward caused by leakage of a sound directed backward as well as deterioration of sound caused by the tunnel effect.

Further object of the present invention is to provide a speaker system for a display which can prevent flickering of an image on the display caused by transmission of vibration to the cabinet from the speaker when the speaker is in operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the speaker system for a display includes a cover frame integrated type speaker having a cover frame for assembly to a rear cover and a speaker for emission of a sound, the cover frame and the speaker integrated together, and the rear cover for fastening to a back side surface of the cover frame integrated type speaker.

In other aspect of the present invention, there is provided a speaker system for a display including a cover frame integrated type speaker having a cover frame for assembly with a rear cover and a speaker for emitting sound integrated with the cover frame, a rear cover fastened to a rear of the cover frame integrated type speaker, and vibration attenuation means disposed between the cover frame integrated type speaker and the cabinet for attenuating a system vibration to prevent transmission of the system vibration to the cabinet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 12A and 12B illustrate an assembly process of a vibration attenuation member in FIG. 11; wherein, FIG. 12A illustrates a section showing a vibration attenuation member being deformed elastically and inserted into a mounting hole, and FIG. 12B illustrates a section showing a vibration attenuation member inserted in a mounting hole with the deformation restored;

DETAILED DESCRIPTION OF THE PREFERRED EMBODIMENT

Figure 6:
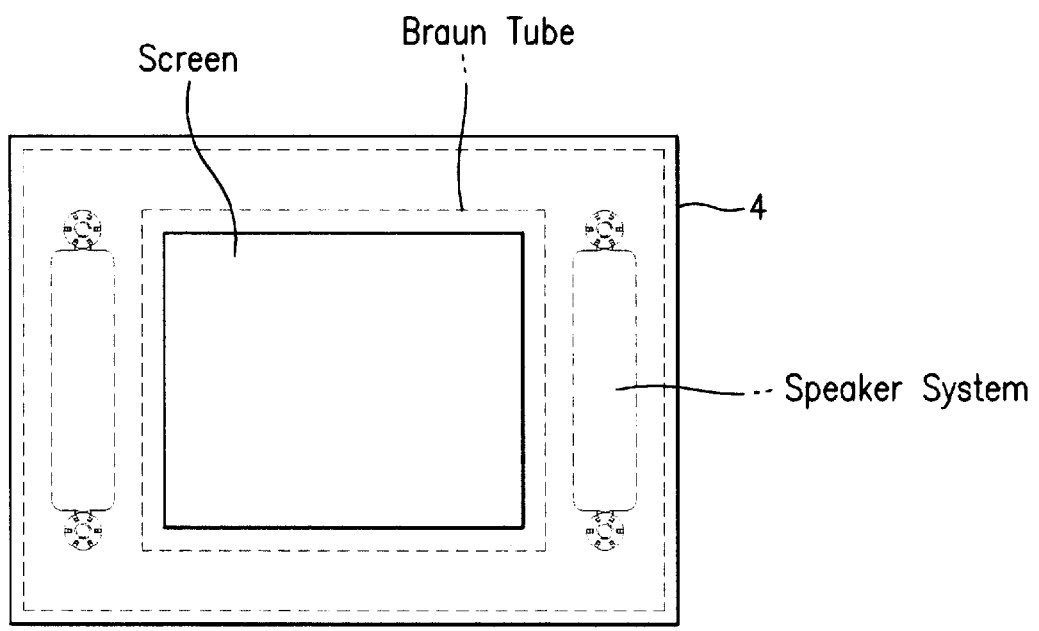
FIG. 6 illustrates a front view of a display showing a speaker system in accordance with a preferred embodiment of the present invention mounted within the display, schematically.
Figure 7A:
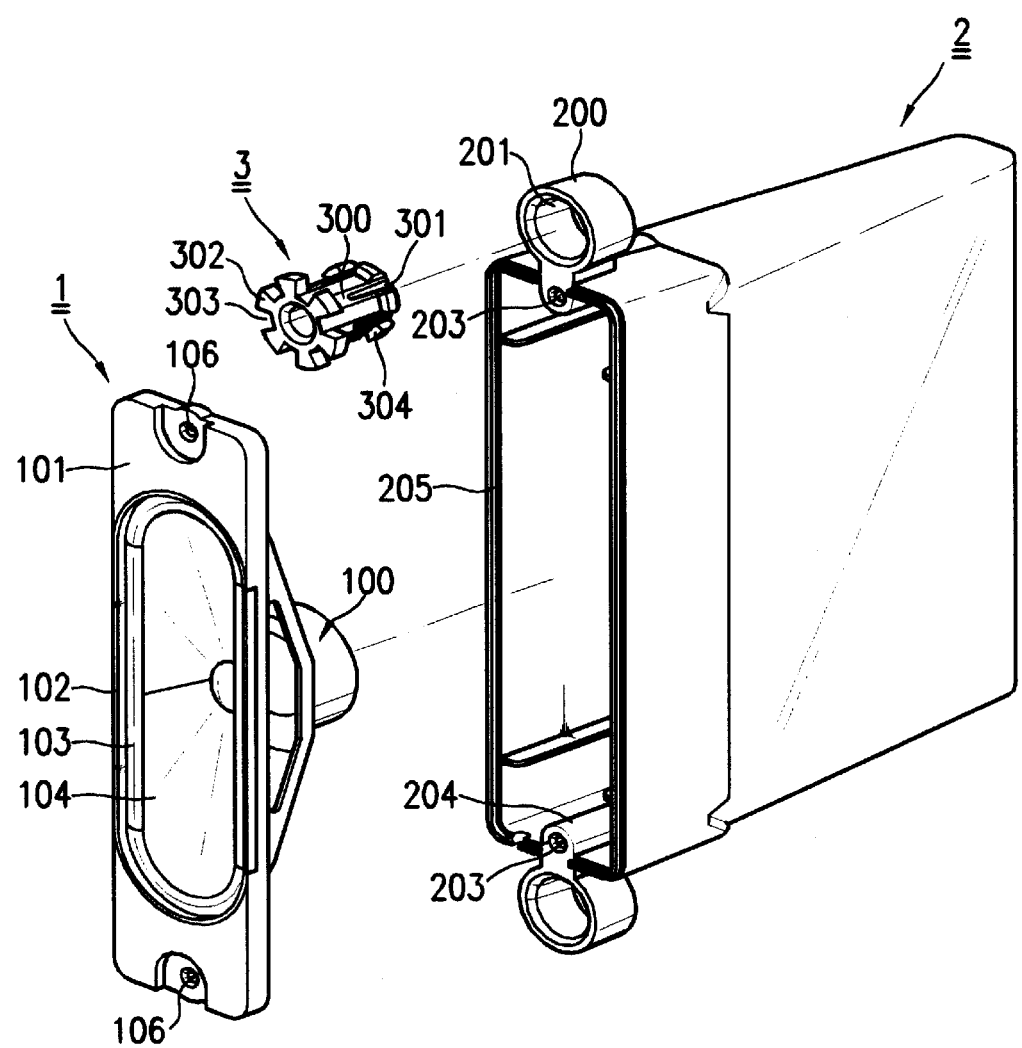
FIG. 7A illustrates a perspective disassembled view showing a speaker system of the present invention.
Figure 7B:
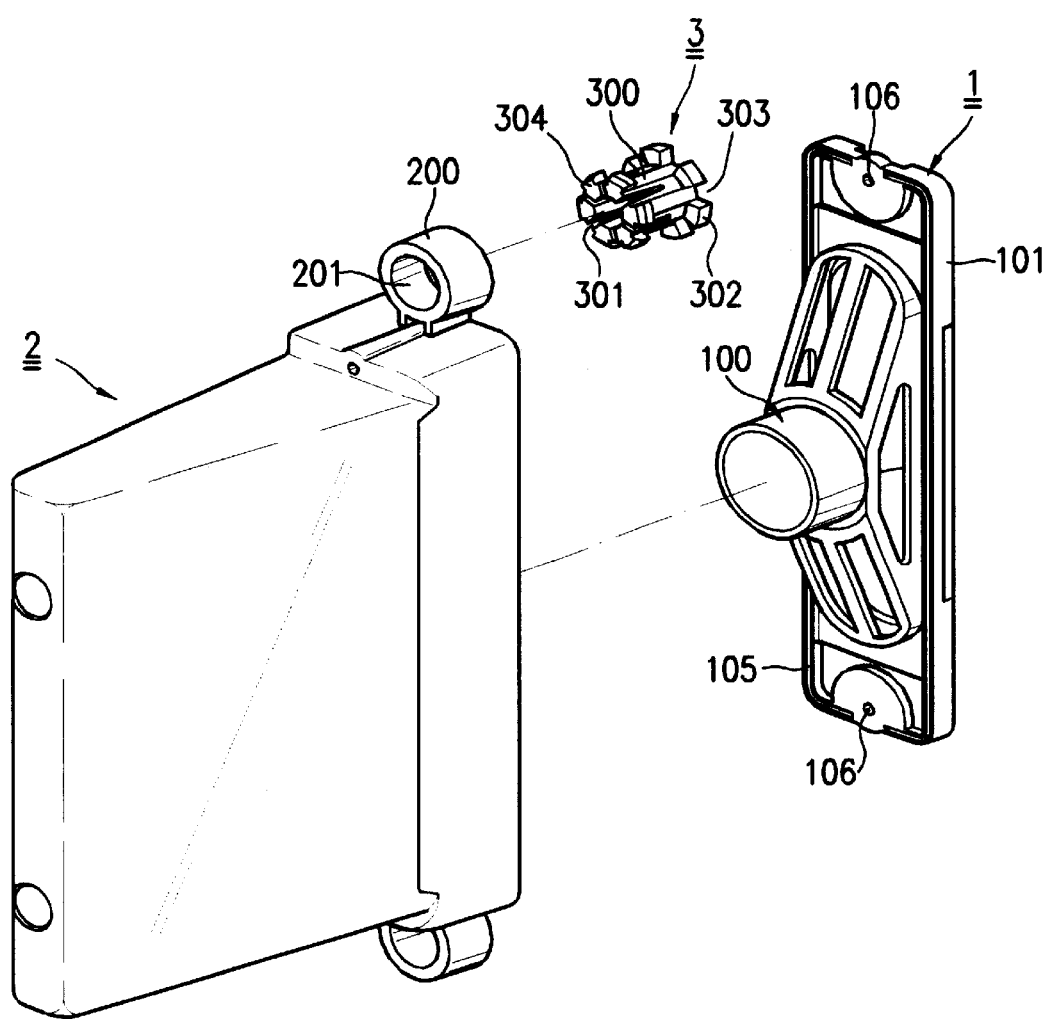
FIG. 7B illustrates a perspective disassembled view showing a speaker system of the present invention seen from back thereof.
Figure 8:
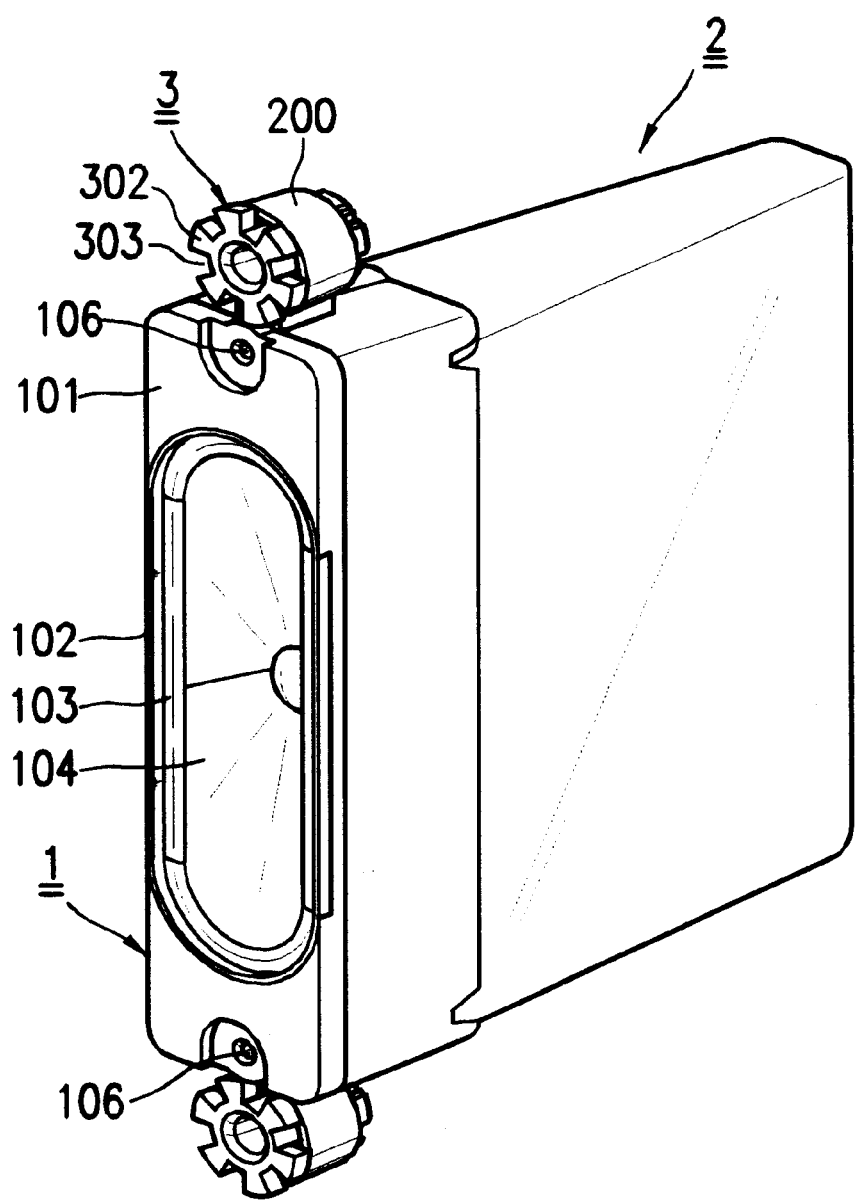
FIG. 8 illustrates a perspective assembled view of a speaker system of the present invention.
Figure 12A:
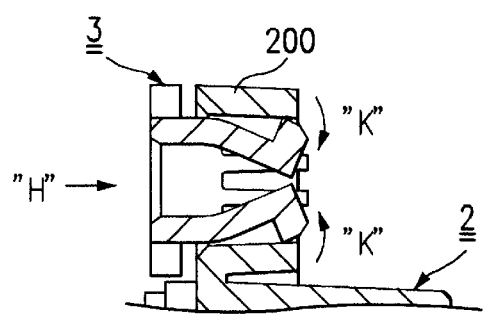
Figure 12B:
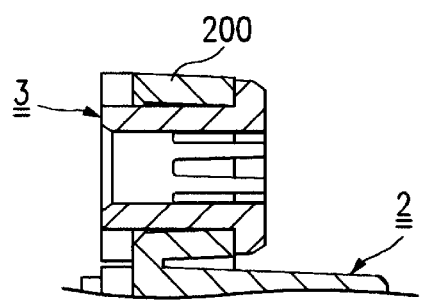
Figure 13A:
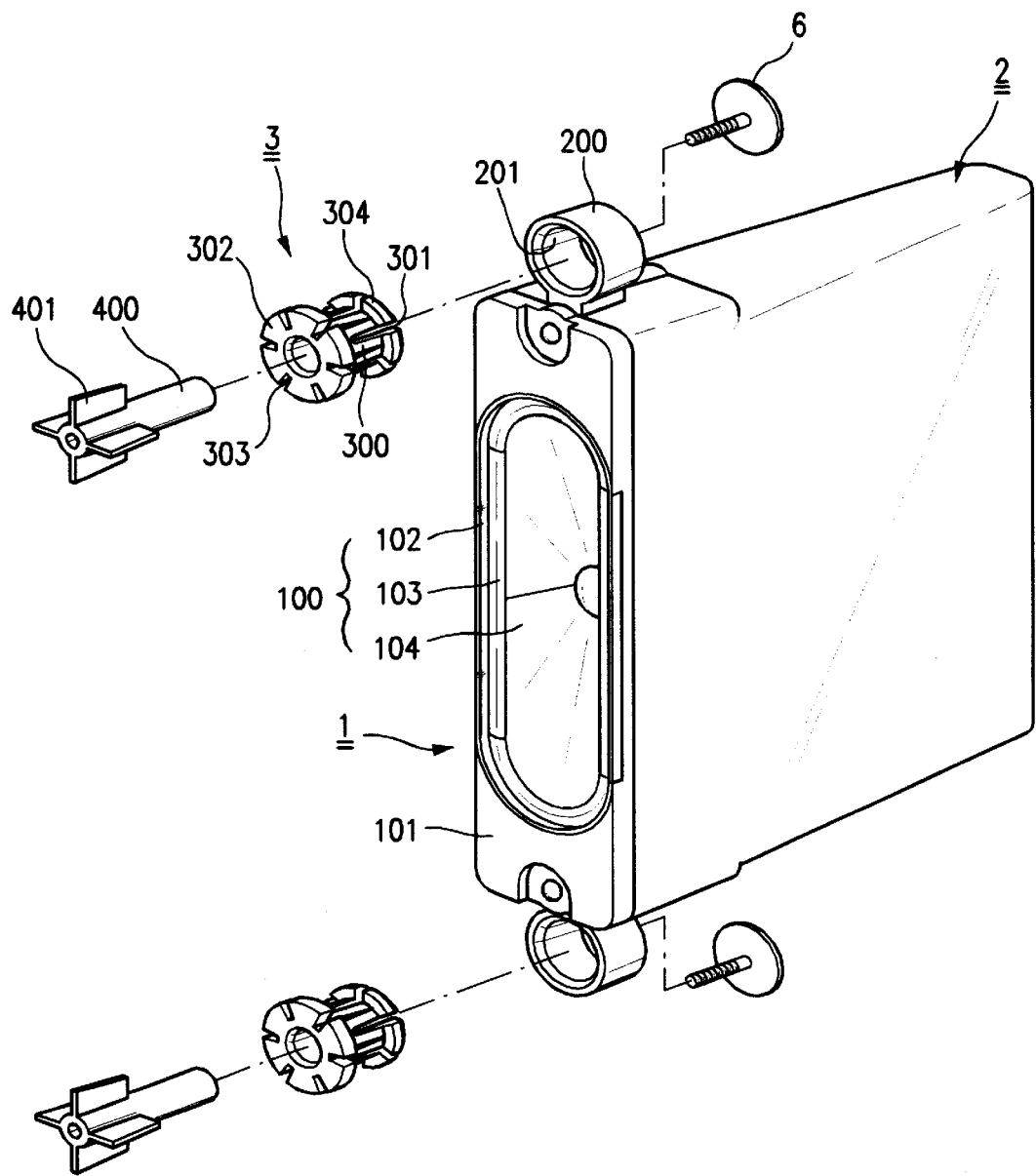
FIG. 13A illustrates a perspective disassembled view of a speaker system in accordance with a first preferred embodiment of the present invention being assembled to fastening bosses for mounting a speaker system mounted to a cabinet.
Figure 13B:
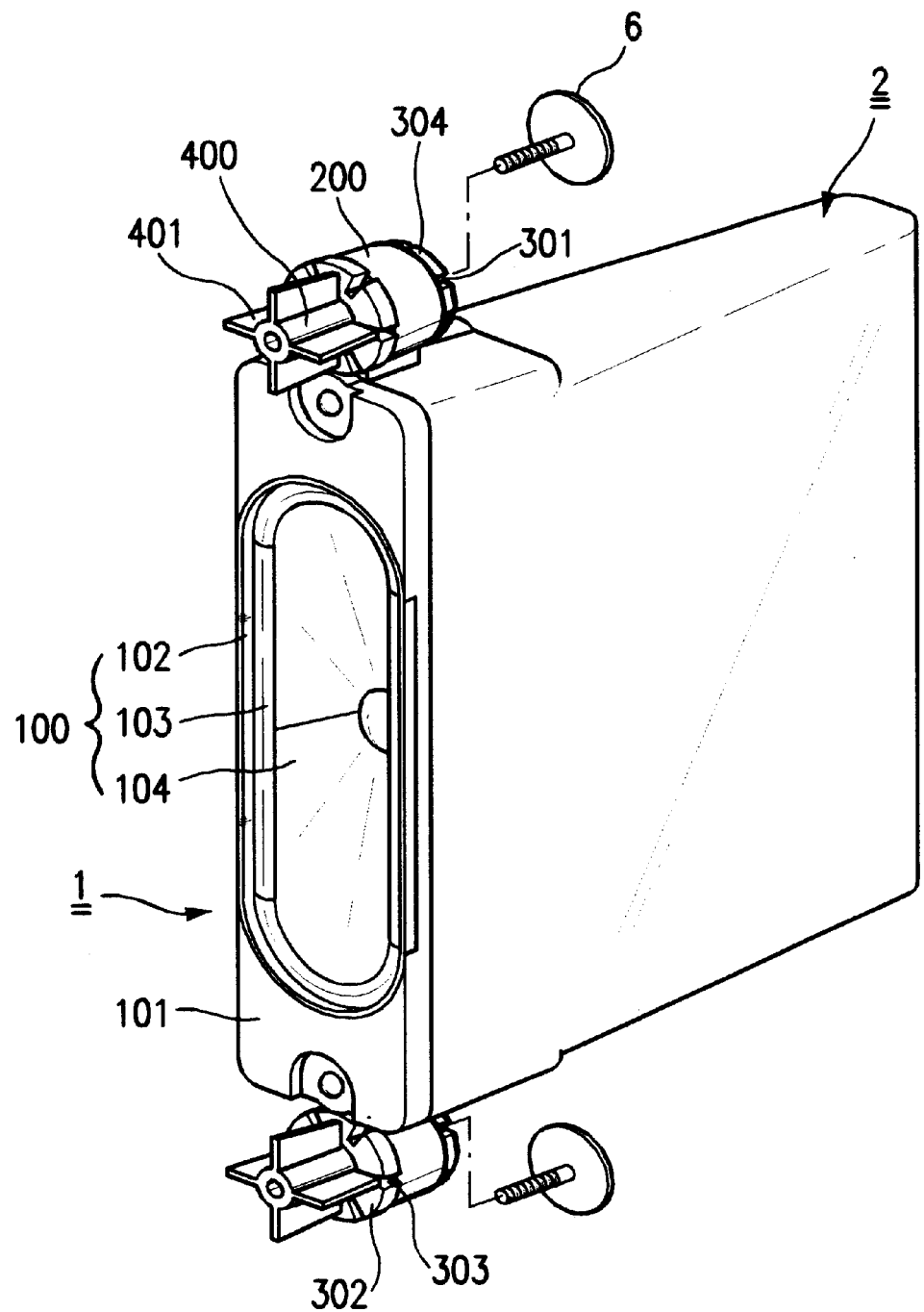
FIG. 13B illustrates a perspective view showing an assembly in FIG. 13A.

Reference will now be made in detail to the preferred embodiments of the present invention, examples of which are illustrated in the accompanying drawings. FIG. 6 illustrates a front view of a display showing a speaker system in accordance with a preferred embodiment of the present invention mounted within the display schematically, FIG. 7A illustrates a perspective disassembled view showing a speaker system of the present invention, FIG. 7B illustrates a perspective disassembled view showing a speaker system of the present invention seen from back thereof, FIG. 8 illustrates a perspective assembled view of a speaker system of the present invention, FIG. 9A illustrates a front view of the speaker system in FIG. 8, FIG. 9B illustrates a side view of the speaker system in FIG. 8, FIG. 10 illustrates a section across line III—III in FIG. 9A, FIG. 11 illustrates a section across line IV—IV in FIG. 9A, FIGS. 12A and 12B illustrate an assembly process of a vibration attenuation member in FIG. 11, wherein FIG. 12A illustrates a section showing a vibration attenuation member being deformed elastically and inserted into a mounting hole, and FIG. 12B illustrates a section showing a vibration attenuation member inserted in a mounting hole with the deformation restored, FIG. 13A illustrates a perspective disassembled view of a speaker system in accordance with a first preferred embodiment of the present invention being assembled to fastening bosses for mounting a speaker system mounted to a cabinet, and FIG. 13B illustrates a perspective view showing an assembly in FIG. 13A.

The speaker system for a display of the present invention includes a cover frame integrated type speaker 1 having a cover frame 101 with screw holes 106 for assembly with a rear cover 2 at top and bottom thereof and a speaker 100 for emitting sound integrated with the cover frame 101, and a box type rear cover 2 fastened to a rear of the cover frame integrated type speaker 1 having a vibration attenuation member mounting unit 200 of a hollow cylinder form provided on top and bottom thereof. A mounting hole 201 in the vibration attenuation member mounting unit 200 is provided for mounting the cover frame integrated type speaker 1 and the rear cover 2 to the cabinet 4, and provided with a vibration attenuation member 3 of rubber or silicone which can attenuate a system vibration transmitted to the cabinet 4 from the speaker. The speaker 100 has a track formed gasket 102 with a short diameter of a size identical to a short side(width) of the cover frame 101, an edge 103 attached to an inner side of the gasket 102 to form a ring, and a cone paper 104 attached to an inner side of the edge 103 in a cone form. There is a projection 204 under the vibration attenuation member mounting unit 200 on the rear cover 2 having a screw fastening hole 203 corresponding to the screw hole 106 each formed on top and bottom of the frame of the cover frame integrated type speaker 1 The gasket 102 for the cover frame integrated type speaker 1 is fitted flush with a front surface of the cover frame 101. There is a groove 105 formed in a rim in a back of the cover frame 101 of the cover frame integrated type speaker 1, and there is 2 a surface of the rear cover for coupling with the cover frame 101, for tight match between the rib 205 on the rear cover 2 with the groove 105 in the cover frame integrated type speaker 1 when the cover frame integrated type speaker 1 is assembled with the rear cover 2, thereby preventing leakage of a sound directed backward. The positions of formation of the rib 205 and the groove 105 may be interchanged, and numbers of the ribs 205 and the grooves 105 on the rear cover 2 and the cover frame 101 may be plural for assuring prevention of the leakage of the sound directed backward. That is, because a length of an escape path of the sonic wave through the rib 205 and the groove 105 is dependent on a geometry of the rib 205 and the groove 105, and the rib 205 cuts off the sonic wave, if numbers of the rib 205 and the groove 105 are increased appropriately, a sonic wave blocking effect is increased. The vibration attenuation member 3 has a body 300 of a hollow cylinder form having a plurality of cut away slots 301 in a circumference surface, a flange portion 302 formed in radial directions on one end thereof having no slots 301 formed therein, and projections 304 formed in radial directions on the other end having the slots 301 in the body 301 formed therein. When the vibration attenuation member 3 is assembled with the vibration attenuation member mounting unit 200, the vibration attenuation member 3 has the body 300 brought into contact with an inner circumference surface of the mounting hole 201 in the vibration attenuation member mounting unit 200, the flange portion 302 caught by a front rim of the vibration attenuation member mounting unit 200, and the projections 304 formed on the other end of the body 300 in radial directions caught by a rear rim of the vibration attenuation member mounting unit 200, thereby preventing falling off of the vibration attenuation member 3 from the vibration attenuation member mounting unit 200. There are a plurality of slots 303 formed in radial directions in the flange portion 302 of the vibration attenuation member 3 for reducing a contact area to the front rim of the vibration attenuation member mounting unit 200 for reducing a vibration transmission area. Ends of the projections 304 of the vibration attenuation member 3 are chamfered for easy insertion of the projections 304 into the mounting hole 201 when the vibration attenuation member 3 is assembled with the vibration attenuation member mounting unit 200. There are speaker system mounting fastening bosses 400(hereafter called as, "system mounting fastening boss") formed on a back surface of the cabinet 4 for fastening the rear cover 2 having the speaker 100 mounted thereon as the vibration attenuation member 3 is inserted and fastened with screws with washer 5, and there are positioning ribs 401 on an outer circumference surface of the system mounting fastening boss 400 for limiting an insertion depth of the vibration attenuation member 3 inserted onto an outer circumference surface of the system mounting fastening boss 400. In this instance, a distance from the positioning ribs 401 to the screw with washer 5 fastened to the system mounting fastening boss 400 is formed greater than an axial length of the vibration attenuation member 3, and a diameter of the system mounting fastening boss 400 is formed smaller than an inside diameter of the body 300 of the vibration attenuation member 3 adequately, so that the screw with washer 5 does not compress the vibration attenuation member 3, and the speaker system having the vibration attenuation member 3 fitted therein is movable along an axial direction of the system mounting fastening boss 400.

The process of assembly and function of the speaker system for a display in accordance with a first preferred embodiment of the present invention will be explained.

Figure 9A:
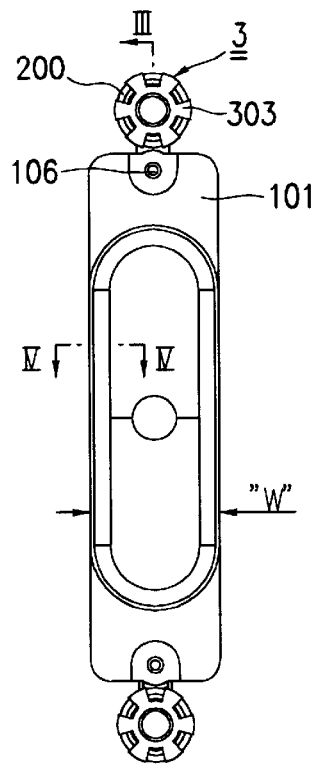
FIG. 9A illustrates a front view of the speaker system in FIG. 8.
Figure 9B:
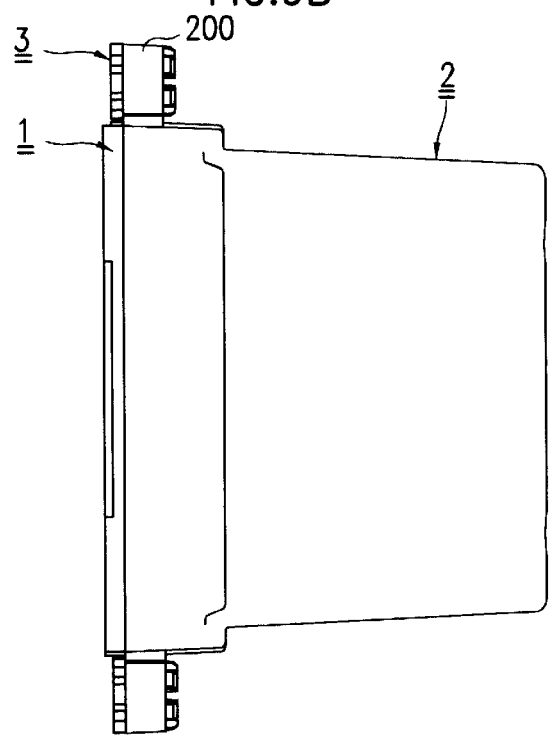
FIG. 9B illustrates a side view of the speaker system in FIG. 8.
Figure 10:
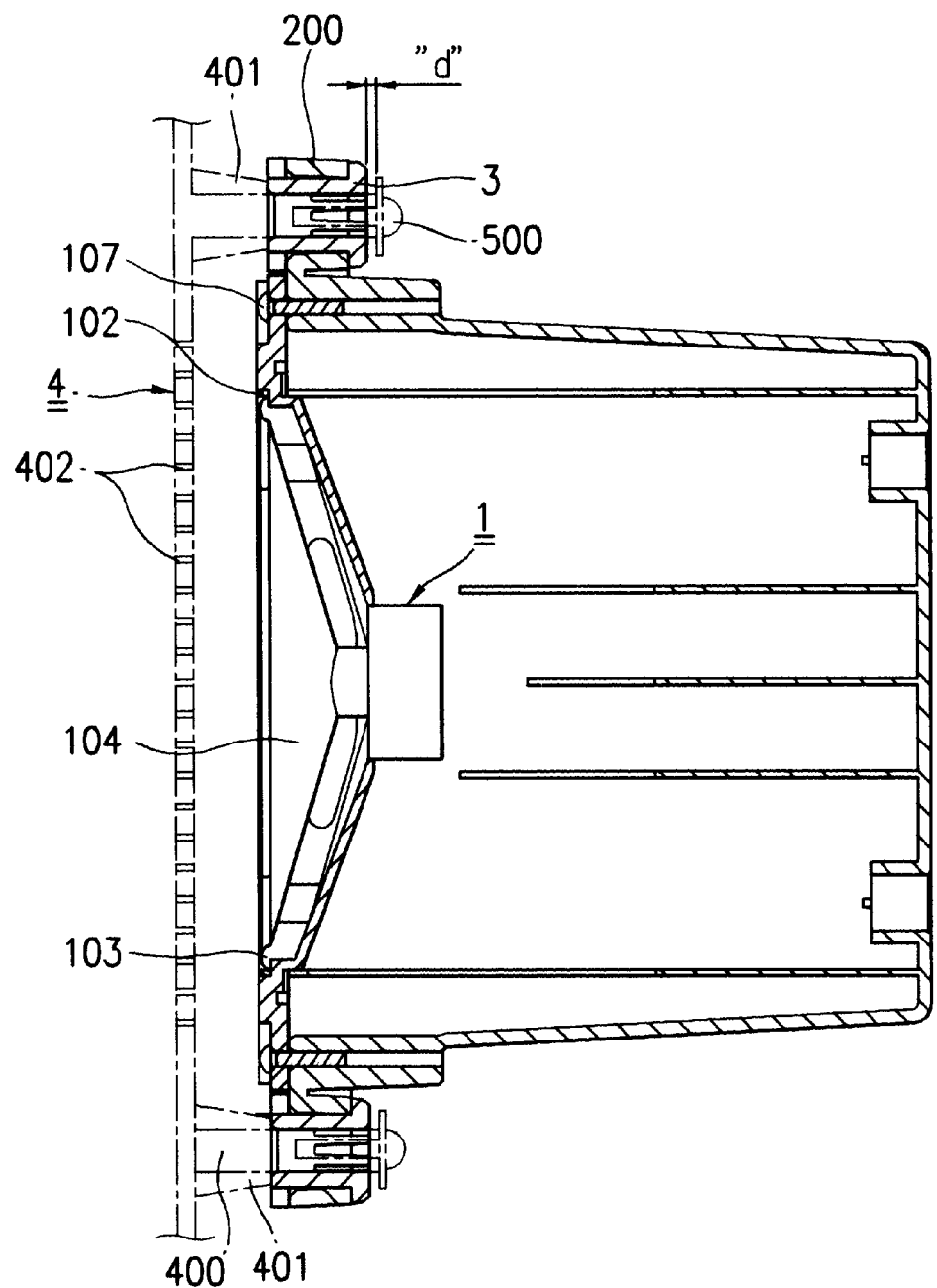
FIG. 10 illustrates a section across line III—III in FIG. 9A.
Figure 11:
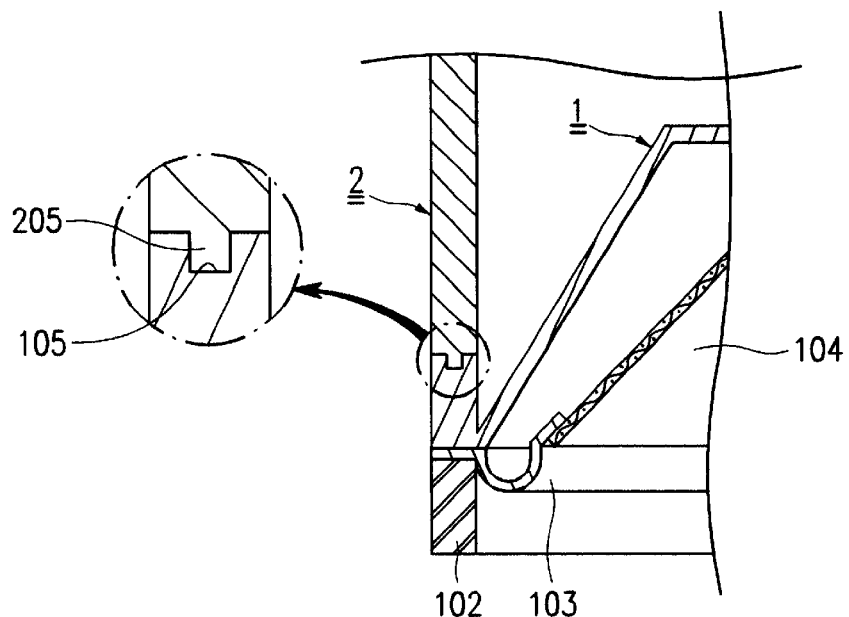
FIG. 11 illustrates a section across line IV—IV in FIG. 9A.

Upon inserting the rib 205(see FIG. 7A) formed on a surface of the rear cover 2 to be coupled with the cover frame 101 into the groove 105(see FIG. 7B) formed in a back of rim of the cover frame 101 of the cover frame integrated type speaker 1, as shown in FIG. 11 illustrating a section across line IV—IV in FIG. 9A, the cover frame integrated type speaker 1 and the rear cover are brought into close contact, perfectly. Under this condition, screws 107 are inserted into the screw fastening holes 203 in the rear cover 2 through the screw holes 106 in the cover frame 101, to assemble the cover frame integrated type speaker 1 and the rear cover 2. According to this, the speaker system for a display in accordance with the first embodiment of the present invention can prevent a pressure loss of a sound directed forward caused by a sound directed backward by means of geometry of the rib 205 and the groove 105. Moreover, since the front cover in the related art speaker system can be omitted in the first embodiment speaker system, together with the fastening members required for fastening the front cover and the speaker, the first embodiment speaker system can save cost and improve working condition in assembly, significantly. As shown in FIG. 12A, after the cover frame integrated type speaker 1 and the rear cover 2 are assembled, upon pushing the vibration attenuation member 3 into the mounting hole 201("H" direction in FIG. 12A) in the mounting unit, the vibration attenuation member 3 is inserted into the mounting hole 201 as the body 300 with the slots 301 are shrunk in a radial direction("K" direction in FIG. 12B). The chamfered ends of the projections 304 help the insertion of the vibration attenuation member 3 into the vibration attenuation member mounting unit 200. As shown in FIG. 12B, after the body 300 of the vibration attenuation member 3 is inserted into the mounting hole 201 completely, the vibration attenuation member 3 restores an original shape by the elastic restoration force of the material itself, to position the projections 304 at the other end of the body 300 having the slots 301 to the rear rim of the vibration attenuation member mounting unit 200, thereby preventing fall off of the vibration attenuation member 3. That is, since the projections 304 at the other end of the body 300 having the slots 301 are caught by the rear rim of the vibration attenuation member mounting unit 200, an axial fall off of the vibration attenuation member 3 is prevented. Then, as shown in FIG. 10, after the body 300 of the vibration attenuation member 3 mounted to the speaker 100 is passed through the system mounting fastening boss 400 on the cabinet 4, a screw with washer 5 is screwed into the fastening boss 400. The assembled state of the system mounting fastening boss 400 and the first embodiment speaker system is seen in FIGS. 13A and 13B. A depth of insertion of the vibration attenuation member 3 is fixed by the positioning rib 401 formed on the outer circumference surface of the system mounting fastening boss 400, and it is preferable that a length of the fastening boss 400 is designed to maintain a gap as shown in "d" in FIG. 10 so that the screw with washer 5 does not press the vibration attenuation member 3. And, it is preferable that a diameter of the system mounting fastening boss 400 on the cabinet 4 is formed smaller than an inside diameter of the body 300 of the vibration attenuation member 3 inserted onto an outer circumference surface of the system mounting fastening boss 400 adequately, for permitting movements of the speaker system having the frame integrated type speaker 1 and the rear cover 2 along an axial direction of the boss between the fastening boss 400 and the screw with washer 5 in a stroke of an amplitude as shown in "d" in FIG. 10.

Different from the related art speaker system in which vibration generated in the speaker 100 is transmitted to the cabinet 4 directly without attenuation caused by the direct connection of the speaker 100 to the cabinet 4 by means of the screw, a rigid body, the vibration generated in the speaker of the present invention is dampened by the vibration attenuation member 3, to reduce the vibration transmitted to the cabinet 4, significantly. Especially, because the slots 301 and 303 formed in the body 300 and the flange portion 302 of the vibration attenuation member 3 respectively in the present invention reduces a contact area between the body 300 of the vibration attenuation member and the system mounting fastening boss 400 on the cabinet 4, a contact area between the flange portion 302 of the vibration attenuation member 3 and the positioning rib 401 on the outer circumference of the boss, a contact area between a front rim of the vibration attenuation member mounting unit 200 and the flange portion of the vibration attenuation member 3, and a contact area between the rear rim of the vibration attenuation member mounting unit 200 and the projections 304 on the vibration attenuation member 3, the vibration transmitted to the cabinet 4 during operation of the speaker can be cut off, effectively. That is, since the contact surface between the vibration attenuation member 3 and the vibration attenuation member mounting unit 200, the contact surfaces between the vibration attenuation member 3 and the system mounting fastening boss 400 and the positioning rib 401 on the cabinet 4 act as vibration transmission surfaces which can be reduced by means of the slots 301 and 303, the vibration transmitted to the cabinet 4 can be reduced in proportion to an amount of reduction of the contact area. Accordingly, the first embodiment speaker system for a display can effectively eliminate the image flickering on a display by cutting off a vibration transmission path according to material characteristics and geometry of the vibration attenuation member 3 together with the reduction of the vibration transmission area. The flange portion 302 of the vibration attenuation member 3 also serves to prevent direct contact of the positioning rib 401 with the vibration attenuation member mounting unit 200.

Figure 1:
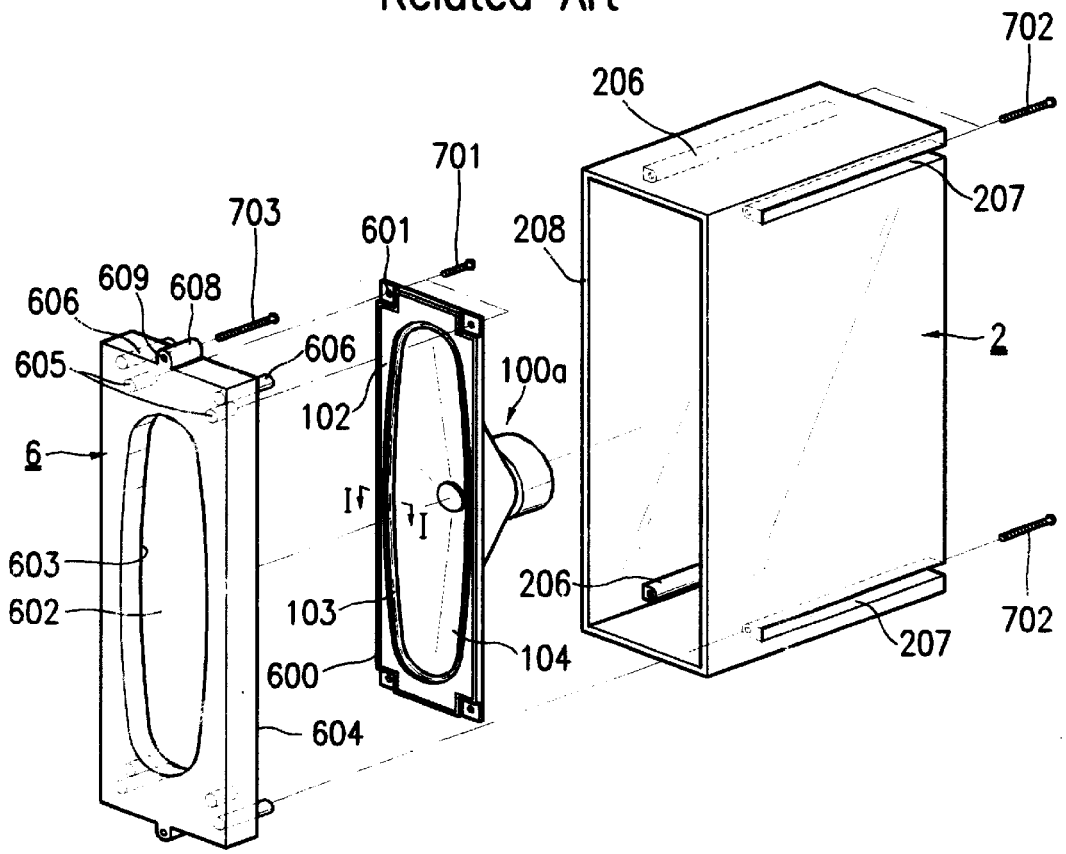
FIG. 1 illustrates a perspective disassembled view of a related art speaker system for a display.
Figure 2:
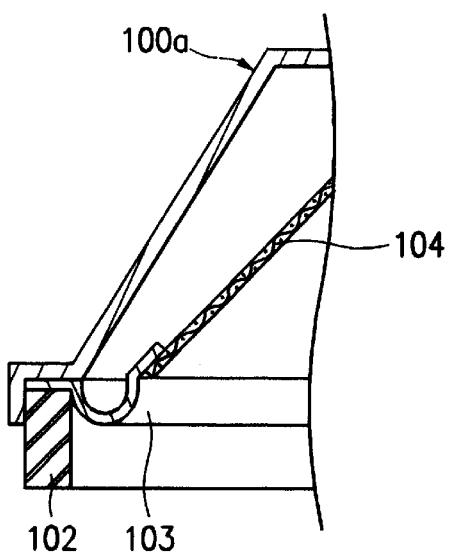
FIG. 2 illustrates a section across line I—I in FIG. 1.
Figure 3:
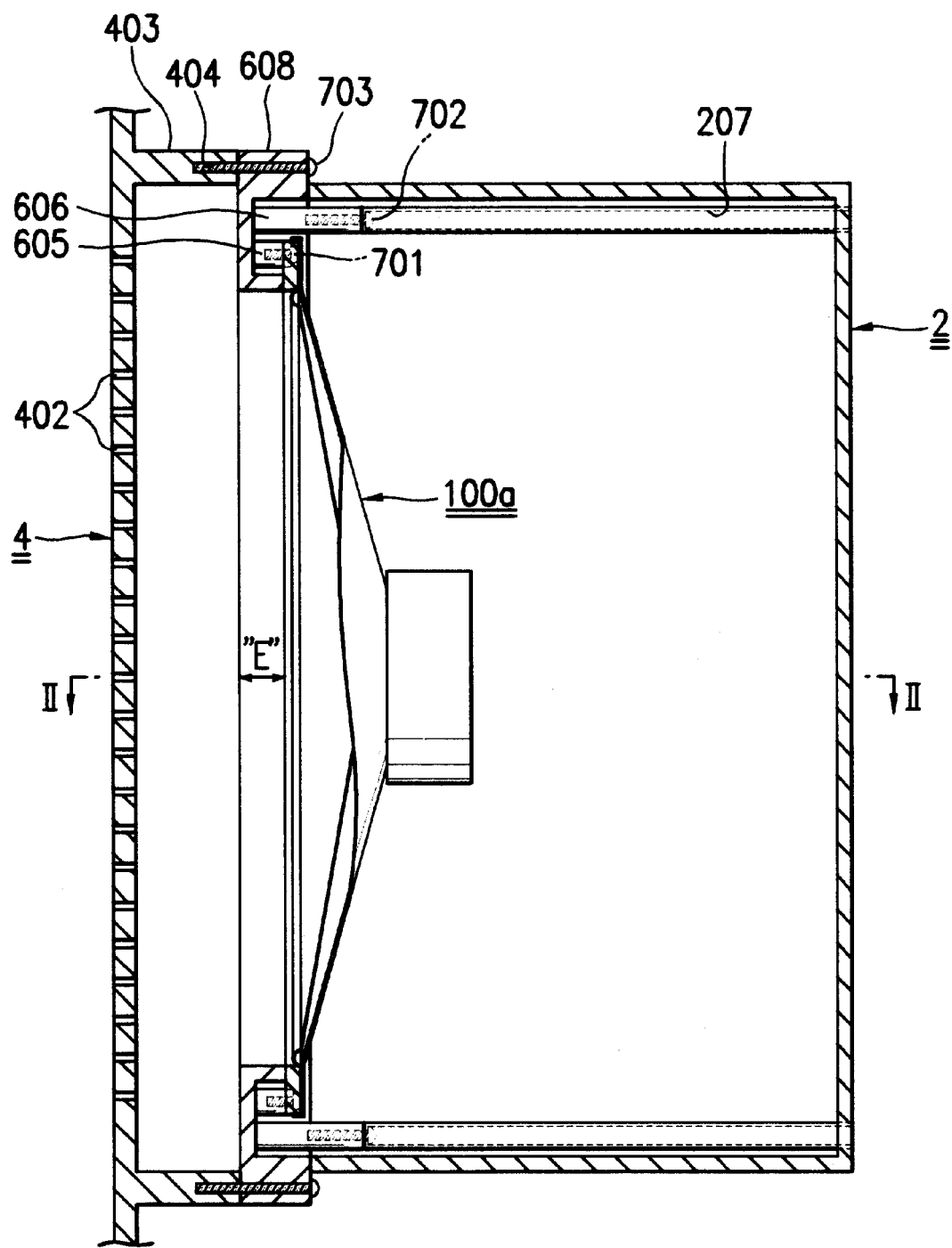
FIG. 3 illustrates a section showing an assembled related art speaker system for a display in FIG. 1.

In the meantime, as can be known from a comparison of FIG. 10 to FIG. 3, different from the related art, the elimination of the front cover can in turn eliminate the deterioration of a sound quality caused by the tunnel effect in the related art, because there is no sound passage provided in front of the gasket 102.

Figure 4:
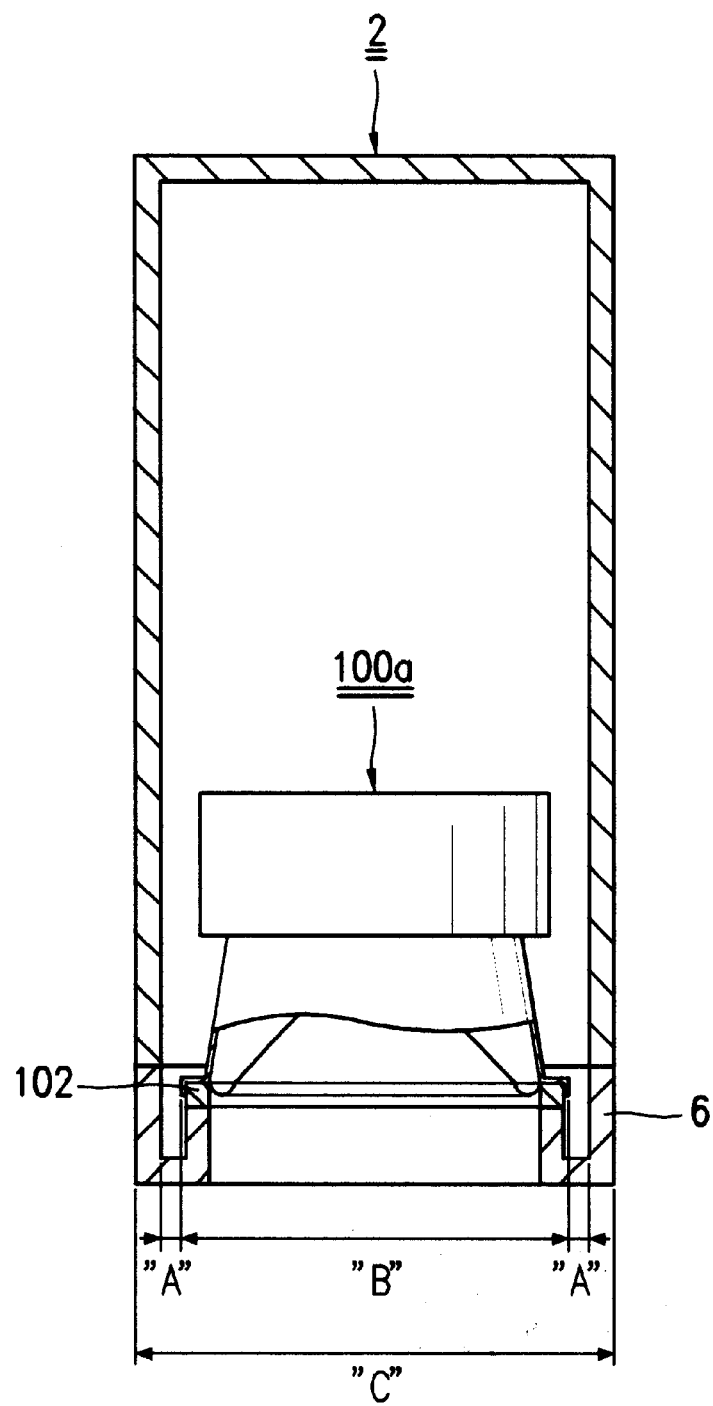
FIG. 4 illustrates a section across line II—II in FIG. 3.
Figure 5:
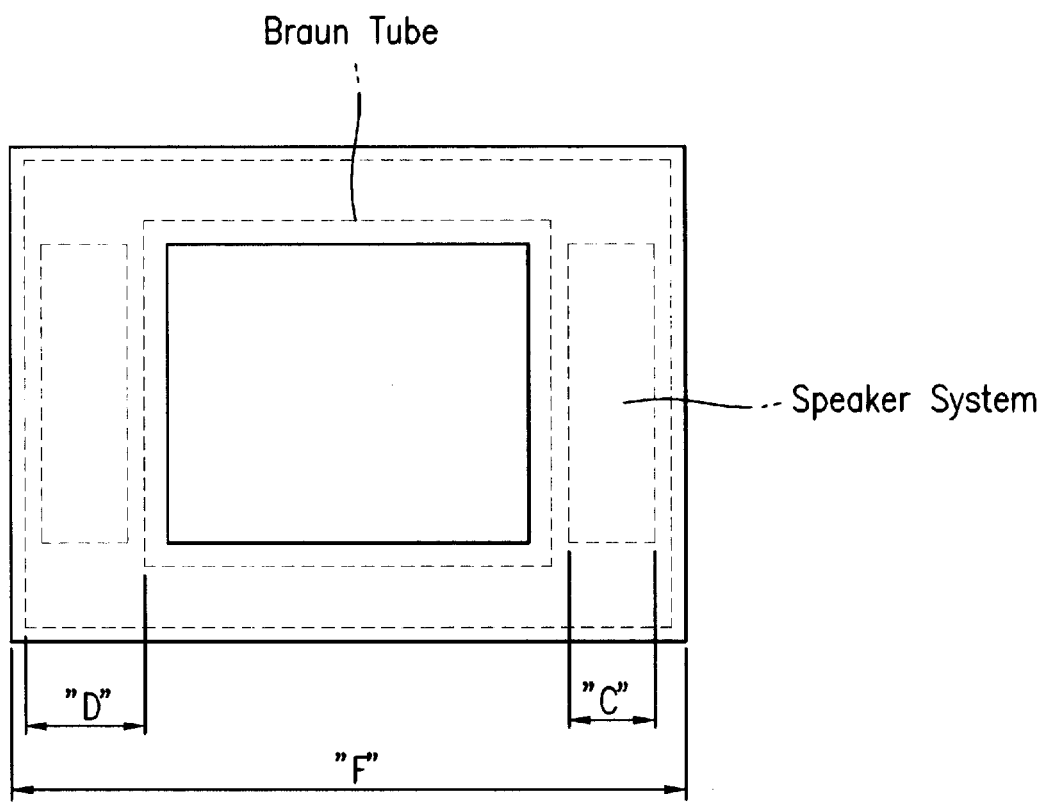
FIG. 5 illustrates a front view of a related art display, schematically.

And, the speaker system of the present invention has the edge 103 and the gasket 102 adhered to the cover frame with an adhesive, and a width of the gasket 102 is identical to a width("W" in FIG. 9A) of the cover frame integrated type speaker 1. Therefore, when if it is assumed in the speaker system of the present invention that a width of the monitor is identical to a width("F" in FIG. 5) of the monitor in the related art speaker system, and a width of the front frame is identical to a width of the front frame in the related art, a short diameter of the speaker 100 which actually emits sound can be made significantly larger than the short diameter of the speaker 100 in the related art speaker system. That is, the short diameter of the speaker 100 can be formed larger by two times of the width "A"(a gap between an inside surface of an outside wall of the front cover and an outside surface of the speaker 100) in FIG. 4 of the related art, which implies that a ratio of the short diameter to the long diameter of the speaker system can be made close to 1:1. Therefore, if other conditions are the same, the first embodiment speaker system for a display can implement a sound quality better than the related art speaker system for a display.

The speaker system for a display of the present invention has the following advantages.

First, since the speaker system for a display of the present invention can save cost and improve a productivity in assembly, prevent a pressure loss of a sound directed forward caused by a leaked sound directed backward, and facilitate attenuation of a system vibration in transmission from the speaker to the cabinet, a high sound quality and a low howling speaker can be made available. That is, because the speaker system of the present invention requires no front cover that is a medium for fastening between the speaker 100 and the rear cover 2, a cost of the speaker system can be dropped, and a productivity in fabrication of components and assembly can be improved.

And, the elimination of the front cover in the speaker system of the present invention permits to use the gap("A" in FIG. 4) required between an inside surface of the outside wall of the front cover and the outside surface of the speaker 100 for providing a larger short diameter of the speaker 100, thereby maximizing the short diameter of the speaker 100 in view of design, permitting to provide a speaker system of better sound quality.

The perfect contact between the cover frame integrated type speaker 1 and the rear cover 2 in the speaker system of the present invention permits to prevent a pressure loss of a sound directed forward caused by a leaked sound directed backward, thereby improving the sound quality.

The elimination of the sound passage through which the sound directed forward passes, preventing occurrence of the tunnel effect, can prevent a quality deterioration of a sound directed forward.

Moreover, the vibration attenuation means provided in the speaker system, which can effectively attenuate the vibration caused by the speaker 100, can prevent image flickering due to the vibration of the speaker system, to permit to provide a speaker of a higher wattage, and a high quality speaker system.

It will be apparent to those skilled in the art that various modifications and variations can be made in the speaker system for a display of the present invention without departing from the spirit or scope of the invention. Thus, it is intended that the present invention cover the modifications and variations of this invention provided they come within the scope of the appended claims and their equivalents.

What is claimed is:

1. A one piece speaker system for a display, comprising:
   a cover frame integrated type speaker having a speaker for emission of a sound and a frame for the speaker forming an outer cover to the speaker system, wherein the cover frame is configured for assembly to a rear cover, wherein the cover frame and the speaker are formed as a continuous structure without having a separate frame for the speaker, and wherein the rear cover is configured to fasten to a back side surface of the cover frame integrated type speaker using at least two vibration attenuation members, wherein one of the at least two vibration attenuation members is fitted, respectively, on a top and a bottom of the rear cover and is configured to reduce transmission of vibration from the speaker to the video display cabinet.

2. The speaker system of claim 1, wherein the cover frame further comprises screw clearance holes, and the rear cover further comprises screw fastening holes at positions corresponding to the screw clearance holes in the cover frame.

3. The speaker system of claim 1, wherein the cover frame further comprises a track formed gasket having a short diameter substantially equal to a thickness of the cover frame.

4. The speaker system of claim 3, wherein the gasket and the cover frame are substantially flush to one another.

5. The speaker system of claim 1, wherein the cover frame further comprises a groove formed in a back surface of the cover frame, and the rear cover further comprises a rib configured to engage the groove in the cover frame when the cover frame and the rear cover are assembled.

6. The speaker system of claim 5, further comprising:
   a plurality of the ribs and grooves, wherein each rib is configured to engage a corresponding groove when the cover frame and the rear cover are assembled.

7. The speaker system of claim 1, further comprising:
   a vibration attenuation member mounting unit comprising a hollow cylindrical body attached to each of the top and the bottom, respectively, of the rear cover, wherein said vibration attenuation member mounting units are configured to respectively engage an outer surface of said vibration attenuation members.

8. The speaker system of claim 7, further comprising:
   speaker system fastening bosses formed on a back surface of the video display cabinet and configured to have the speaker fastened thereto with a vibration attenuation member engaged around the fastening boss and within the vibration attenuation member mounting unit, and positioning ribs on an outer circumference surface of the speaker system fastening bosses for limiting an insertion depth of the vibration attenuation member engaged onto an outer circumference surface of the speaker system fastening bosses.

9. The speaker system of claim 8, wherein a distance from the positioning rib to a fastening member fastened to the speaker system fastening boss is greater than an axial length of the vibration attenuation member, and a diameter of the speaker system fastening boss is formed smaller than an inside diameter of the body of the vibration attenuation member engaged onto an outer circumference surface of the speaker system fastening boss, so that the fastening member does not compress the vibration attenuation member, and the speaker and the rear cover both having the vibration attenuation member coupled thereto are free to move along an axial direction of the speaker system fastening boss.

10. The speaker system of claim 7, wherein each vibration attenuation member comprises:
    a cylindrical body comprising a first end and a second end and multiple first longitudinal slots and multiple second longitudinal slots on an outer surface of said hollow cylindrical body, wherein said first longitudinal slots start at said first end and terminate before said second end and said second longitudinal slots start at said second end and terminate before said first end, and wherein said second longitudinal slots pass through said body;

a flange portion formed at said first end; and multiple projections projected in radial directions formed at said second end.

11. The speaker system of claim 10, wherein the body of the vibration attenuation member is brought into contact with an inner circumference surface of said hollow cylinder, and the flange portion of the vibration attenuation member engages a rim of the hollow cylinder, and the projections of the vibration attenuation member are pushed through the hollow cylinder in the vibration attenuation member mounting unit, such that the projections are caught by a rear rim of the hollow cylinder.

12. The speaker system of claim 11, wherein the projections are chamfered for easy insertion into the hollow cylinder.

13. The speaker system of claim 11, wherein the flange portion of the vibration attenuation member comprises multiple third slots formed in radial directions for reducing a contact area with a front rim of the vibration attenuation member mounting unit.

14. The speaker system of claim 13, wherein the vibration attenuation member comprises rubber or silicone.

15. A one piece speaker system for a video display cabinet, comprising:

a rear cover comprising an enclosure defining a hollow interior and an aperture which communicates with said hollow interior; and a one piece cover frame and speaker integrally formed as a continuous structure without having a separate frame for the speaker and forming a frame for a speaker and forming an outer cover to the speaker system, wherein the cover frame is configured to attach to said rear cover, wherein said cover frame is configured to cover said aperture when attached to said enclosure, and wherein said rear cover further comprises a continuous rib proximate to and encircling said aperture, and said cover frame comprises a groove configured to engage said rib when said speaker is attached to said rear cover.

16. The speaker system of claim 15, wherein said rear cover comprises a plurality of concentric continuous ribs proximate to and encircling said aperture, and said cover frame comprises a corresponding plurality of continuous grooves, wherein each groove is configured to engage a respective continuous rib when said cover frame is attached to said rear cover.

17. A one piece speaker system for a video display cabinet, comprising:

a rear cover comprising an enclosure defining a hollow interior and an aperture which communicates with said hollow interior; and a one piece cover frame and speaker integrally formed as a continuous structure without having a separate frame for the speaker and forming a frame for a speaker and forming an outer cover to the speaker system, wherein the cover frame is configured to attach to said rear cover, wherein said cover frame is configured to cover said aperture when attached to said enclosure, wherein said rear cover further comprises a vibration attenuation member mounting unit attached to said rear cover, said vibration attenuation member mounting unit comprising a body portion defining an aperture therethrough, said aperture being configured to engage a vibration attenuation member, and wherein said vibration attenuation member comprises:

a body portion defining a hollow cylinder comprising an inner surface and an outer surface;

a flange portion connected proximate to a first end of said body portion, wherein said flange portion protrudes radially outward from said outer surface; and multiple protrusions connected proximate to a second end of said body portion, wherein said multiple protrusions protrude radially outward from said outer surface.

18. A one piece speaker support system for a video display cabinet, comprising:

a rear cover comprising an enclosure defining a hollow interior and an aperture which communicates with said hollow interior and a continuous rib proximate to said aperture; and a one piece speaker frame configured to attach to said rear cover, wherein said speaker frame comprises a continuous groove configured to engage said continuous rib when said speaker frame is attached to said rear cover, wherein said rear cover comprises a plurality of concentric continuous ribs proximate to and encircling said aperture, and said speaker frame comprises a corresponding plurality of continuous grooves, wherein each groove is configured to engage a respective continuous rib when said speaker frame is attached to said rear cover.

19. The speaker system of claim 18, wherein said rear cover further comprises a vibration attenuation member mounting unit attached to said rear cover, said vibration attenuation member mounting unit comprising a body portion defining a mounting aperture therethrough, said mounting aperture being configured to engage a vibration attenuation member.

20. A one piece speaker support system for a video display cabinet, comprising:

a rear cover comprising an enclosure defining a hollow interior and an aperture which communicates with said hollow interior;

a one piece cover frame configured to attach to said rear cover and forming a frame for a speaker and forming an outer cover to the speaker system without having a separate frame for the speaker, wherein said cover frame comprises a continuous groove configured to engage a continuous rib when said cover frame is attached to said rear cover; and at least one vibration attenuation member mounting unit attached to said rear cover, said vibration attenuation member mounting unit comprising a mounting aperture configured to receive a vibration attenuation member, wherein said at least one vibration attenuation member comprises:

a body portion defining a hollow cylinder comprising an inner surface and an outer surface;

a flange portion connected proximate to a first end of said body portion, wherein said flange portion protrudes radially outward from said outer surface; and multiple protrusions connected proximate to a second end of said body portion, wherein said multiple protrusions protrude radially outward from said outer surface.

21. The speaker system of claim 20, wherein said rear cover further comprises a continuous rib proximate to and encircling said aperture, and said cover frame comprises a groove configured to engage said continuous rib when said speaker is attached to said rear cover.

22. The speaker system of claim 20, wherein said rear cover further comprises a vibration attenuation member mounting unit attached to said rear cover, said vibration attenuation member mounting unit comprising a body portion defining a mounting aperture therethrough, said mounting aperture being configured to engage a vibration attenuation member.

23. The speaker support system of claim 20, wherein said second end of said body portion is chamfered.

24. A one piece speaker system for a display, comprising:
- a one piece cover frame integrated type speaker having a speaker for emission of a sound and a frame for the speaker forming an outer cover to the speaker system, wherein the cover frame is configured for assembly to a rear cover, wherein the cover frame and the speaker are integrated together without having a separate frame for the speaker, wherein the rear cover is configured to fasten to a back side surface of the cover frame integrated type speaker;
- at least two vibration attenuation members, wherein each vibration attenuation member comprises:
  - a cylindrical body comprising a first end and a second end and multiple first longitudinal slots and multiple second longitudinal slots on an outer surface of said hollow cylindrical body, wherein said first longitudinal slots start at said first end and terminate before said second end and said second longitudinal slots start at said second end and terminate before said first end, and wherein said second longitudinal slots pass through said body;
  - a flange portion formed at said first end; and
  - multiple projections projected in radial directions formed at said second end, wherein each of the at least two vibration attenuation members is fitted, respectively, on a top and a bottom of the rear cover and is configured to reduce transmission of vibration from the speaker to the video display cabinet.

25. The speaker of claim 24, wherein the rear cover comprises at least one vibration attenuation member mounting unit comprising a hollow cylinder, wherein the body of the vibration attenuation member is brought into contact with an inner circumference surface of said hollow cylinder, and the flange portion of the vibration attenuation member engages a rim of the hollow cylinder, and the projections of the vibration attenuation member are pushed through the hollow cylinder in the vibration attenuation member mounting unit, such that the projections are caught by a rear rim of the hollow cylinder.

26. The speaker of claim 25, wherein the flange portion of the vibration attenuation member comprises multiple third slots formed in radial directions for reducing a contact area with a front rim of the vibration attenuation member mounting unit.

27. The speaker of claim 26, wherein the vibration attenuation member comprises rubber or silicone.

28. The speaker of claim 25, wherein the projections are chamfered for easy insertion into the hollow cylinder.

29. A one piece speaker system for a display, comprising:
- a one piece cover frame integrated type speaker having a speaker for emission of a sound and a frame for the speaker forming an outer cover to the speaker system, wherein the cover frame is configured for assembly to a rear cover, the cover frame and the speaker being integrated together without having a separate frame for the speaker, wherein the rear cover is configured to fasten to a back side surface of the cover frame integrated type speaker;
- at least two vibration attenuation members, wherein each of the at least two vibration attenuation members is fitted, respectively, on a top and a bottom of the rear cover and is configured to reduce transmission of vibration from the speaker to a video display cabinet;
- a vibration attenuation member mounting unit comprising a hollow cylindrical body attached to each of the top and the bottom, respectively, of the rear cover, wherein said vibration attenuation member mounting units are configured to respectively engage an outer surface of said vibration attenuation members; and
- at least one fastening boss formed on a back surface of the video display cabinet and configured to have the speaker fastened thereto with a vibration attenuation member engaged around the fastening boss and within the vibration attenuation member mounting unit, and positioning ribs on an outer circumference surface of the fastening boss for limiting an insertion depth of the vibration attenuation member engaged onto the outer circumference surface of the fastening boss.

30. The speaker of claim 29, wherein a distance from the positioning rib to a fastening member fastened to the fastening boss is greater than an axial length of the vibration attenuation member, and a diameter of the fastening boss is formed smaller than an inside diameter of the body of the vibration attenuation member engaged onto an outer circumference surface of the fastening boss, so that the fastening member does not compress the vibration attenuation member, and the speaker and the rear cover both having the vibration attenuation member coupled thereto are free to move along an axial direction of the speaker system mounting fastening boss.

31. A one piece speaker support system for a video display cabinet, comprising:
- a rear cover comprising an enclosure defining a hollow interior and an aperture which communicates with said hollow interior;
- a one piece cover frame configured to attach to said rear cover and forming a frame for a speaker without having a separate frame for the speaker and forming an outer cover to the speaker system, wherein said cover frame comprises a continuous groove configured to engage a continuous rib when said cover frame is attached to said rear cover; and
- at least one vibration attenuation member mounting unit attached to said rear cover, said vibration attenuation member mounting unit comprising a mounting aperture configured to receive a vibration attenuation member, wherein said vibration attenuation member comprises:
  - a body portion defining a hollow cylinder comprising an inner surface and an outer surface;
  - a flange portion connected proximate to a first end of said body portion, wherein said flange portion protrudes radially outward from said outer surface; and
  - multiple protrusions connected proximate to a second end of said body portion, wherein said multiple protrusions protrude radially outward from said outer surface.

* * * * *